United States Patent [19]
Sekido et al.

[11] 3,909,292
[45] Sept. 30, 1975

[54] LEAD STORAGE BATTERY

[75] Inventors: Satoshi Sekido, Kyoto; Sadao Fukuda, Daito, both of Japan

[73] Assignee: Matsushita Electric Industrial Co., Ltd., Kadoma, Japan

[22] Filed: Apr. 5, 1974

[21] Appl. No.: 458,136

Related U.S. Application Data

[62] Division of Ser. No. 289,051, Sept. 14, 1972.

[30] Foreign Application Priority Data
Oct. 27, 1971 Japan.............................. 46-85352
Nov. 9, 1971 Japan.............................. 46-89256
Oct. 27, 1971 Japan.......................... 46-99858[U]

[52] U.S. Cl. ............................................. 136/27
[51] Int. Cl.² ....................................... A01M 39/00
[58] Field of Search ............ 136/26, 27, 34, 74, 75, 136/177

[56] References Cited
UNITED STATES PATENTS

| 2,856,446 | 10/1958 | McCallum ............................ 136/26 |
| 3,347,969 | 6/1969 | Tudor et al. ......................... 136/26 |
| 3,351,445 | 11/1967 | Fielder et al. .................... 136/27 X |
| 3,446,670 | 5/1969 | Schilling ............................ 136/27 |
| 3,819,412 | 6/1974 | Taylor et al. .................... 136/26 X |
| 3,859,134 | 1/1975 | Shirodker ........................ 136/27 X |

*Primary Examiner*—John H. Mack
*Assistant Examiner*—C. F. Lefevour
*Attorney, Agent, or Firm*—Stevens, Davis, Miller & Mosher

[57] ABSTRACT

A lead storage battery with electrodes made of nonwoven fabric of lead fibers, said electrodes being porous and having a large specific surface area, resulting in a higher utilization rate of lead and higher energy density thereof.

11 Claims, 21 Drawing Figures

LEAD STORAGE BATTERY

This is a division of application Ser. No. 289,051, filed Sept. 14, 1972.

The present invention relates to a lead storage battery used as a power supply for an electric automobile, a portable cordless electric device and others which demand a high energy density.

More and more unfavorable criticism upon the gasoline automobile for its noxious exhaust gas has expedited the development of an electric automobile in recent years. Also, there is more and more demand for cordless electric devices which can be used anywhere without a fixed power supply. All these trends call for development of a secondary battery which is both small and light in weight while large in output, that is, high in energy density, low in self-discharge rate, and resonable in cost. The lead storage battery satisfies these requirements more than other secondary batteries because they have comparatively low cost, simple operation and slow self-discharge rate.

A conventional lead storage battery even with the paste-type electrode plates suitable for the above-mentioned purposes has an energy density as low as 35 wh/kg and is difficult to commercialize as a power supply for electric automobile or cordless electric device. This low energy density is considered to be attributable to the fact that only a thin portion of the surface layer of active material, i.e., about 80 A and 150 A for positive and negative electrodes respectively participates in chemical reaction, so that the greater portion of the paste-type electrodes comprising a grid structure filled with paste-like active materials does not contribute at all to the chemical reaction, resulting in a lower ratio between the mass of active material effectively used in the chemical reaction and the total mass of the active material making up the electrodes, i.e., a lower utilization rate of active material. In other words, the paste-type electrodes have too much active materials which are not used in the chemical reaction, thereby lowering the energy density of the lead storage battery involved.

Attempts have been made to increase the utilization rate or energy density of the paste-type electrodes. For example, a study has been made to improve the utilization rate of the active material by making the particles of the raw material finer and thus increasing the specific surface area of the active materials. The disadvantage of this method is that the too fine particles of the raw material cause some of the particles near the surface of the active material to be left without being reacted on, thereby adversely affecting the utilization rate. Another attempt to increase the utilization rate involves an effort to reduce the weight of the grid of the paste-type electrode which does not contribute directly to the reaction even though the grid functions not only to support the active material filled therein but to lead out electric current. The current level of casting technique, however, is not high enough to reduce the grid weight to less than 40% of the total weight of the electrode. Further, the reduced weight of the grid results in a shorter period of time for which the active material is capable of being supported by the grid.

An object of the present invention is to provide a lead storage battery with a high energy density.

Another object of the present invention is to provide a lead storage battery with a slow-rate of self-discharge.

For the purpose of attaining the above-mentioned objects, the lead storage battery according to the present invention is characterized by electrodes made of lead fibers, which comprises either pure lead fibers or lead-alloy fibers.

The above and other objects, features and advantages will be made apparent by the detailed description taken in conjunction with the accompanying drawings, in which.

Figure 1:
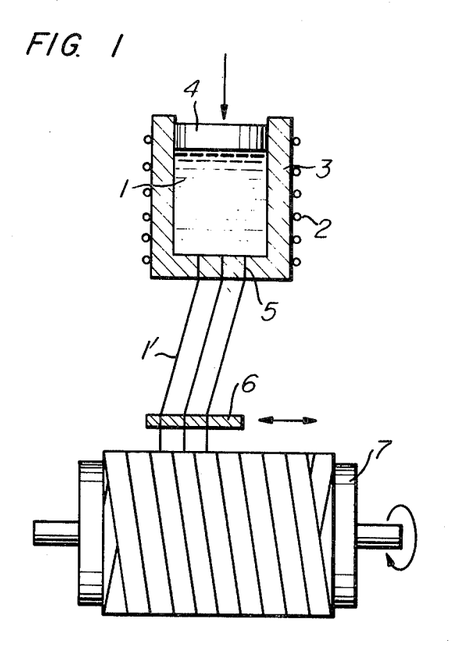
FIG. 1 is a schematic diagram showing the construction of the system for manufacturing lead fibers used in the present invention.

The lead fiber manufacturing system shown in FIG. 1 is used first to obtain the lead fabric. In this figure, lead 1 is melted by heating it to about 350°C in the melting pot 3 made of iron and equipped with a heater 2. The cylinder 4 is pushed downward so that the liquid lead is pushed out of a plurality of nozzles 5 provided in the bottom of the pot 3. The lead fiber 1 pushed out of the nozzles 5 is cooled and rolled around the roll 7 through the guide 6. Pressure is applied to the lead fibers on the roll 7, and incision marks are put on the lead fibers. It is then removed from the roll 7 and cut into an appropriate size to make unwoven fabric. The porosity of the unwoven fabric thus made permits charge-discharge reaction to occur both in the surface of and within the electrode, resulting in a high utilization rate of the active material. As a result, the lead storage battery employing such electrodes has a high energy density and output despite its light weight.

The inventors have found, however, that the electrodes made of unwoven lead fabric cause short-circuiting after relatively few charge-discharge cycles. This is because the lead fabric of the positive electrodes extends in four directions until it contacts the negative electrodes. This means that the tensile strength of the lead fabric is lower than the strength of the volume expansion which occurs when lead is transformed into lead oxide. It is desirable to use, therefore, as in the present invention, a Pb–Ag alloy, Pb–As alloy, Pb–Sn alloy or an alloy with these three metal components characterized by high tensile strength, the tensile strength of Pb–Ag alloy with 0.1% by weight of Ag being 2.05 kg/mm$^2$ and that of Pb–As alloy with 0.3% by weight of As being 2.12 kg/mm$^2$.

Figure 2A:
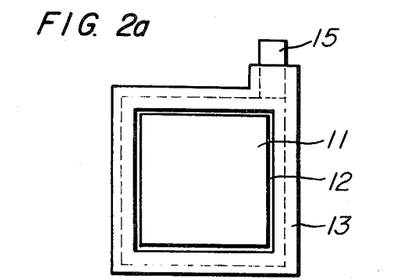
FIGS. 2a and 2b are disgrams showing front and sectional views respectively of a small electrode made of lead fibers.
Figure 2B:
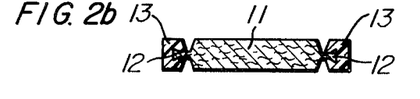
Figure 3A:
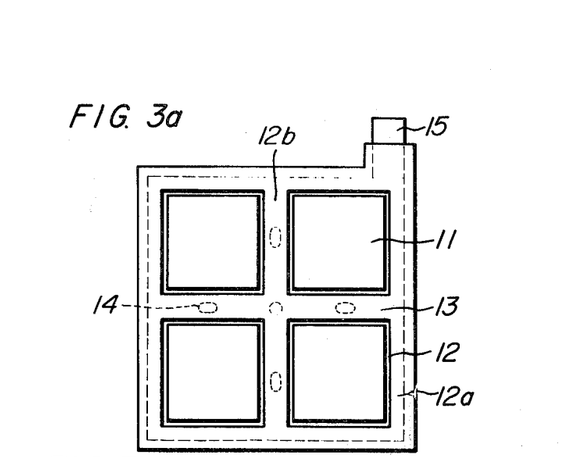
FIGS. 3a and 3b show front and sectional views respectively of a large electrode made of lead fibers.
Figure 3B:
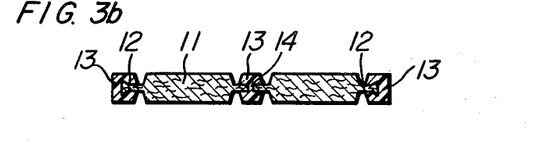

Further, in order to prevent the internal short-circuiting due to the expansion of the electrode plate in its peripheral direction, it is desirable not only to provide the lead fibers with a high tensile strength but to form, as shown in FIGS. 2a, 2b, 3a and 3b, a hard-pressed portion 12 at least on the periphery of each of the electrodes proper made of unwoven lead fabric and to cover the hardpressed portion 12 with a synthetic resin film 13. For a small electrode, it is sufficient, as shown in FIGS. 2a and 2b, to form the hard-pressed portion only on the periphery of the electrode plate proper 11 and to cover the synthetic resin film 13 on the hard-pressed portion 12. A large electrode, however, as shown in FIGS. 3a and 3b, requires the hard-pressed portion to be formed both along the periphery and inside of the electrode proper 11 in a pattern of grid. In addition, a plurality of connecting apertures 14 are preferably bored through the electrode plate 11 at suitable points of the inside portions 12b excepting the peripheral portion 12a among the hard-pressed portions 12, in order that the synthetic resin films 13 covering over both sides of the hard-pressed portions 12 may be integrally connected with each other through the connecting apertures 14. Also, by pressing the peripheral portions of the electrode proper 11 in such a manner that the inside of the periphery is thinner than the outside thereof to form each of the peripheral portions into the shape of a wedge, as shown in FIGS. 2b and 3b, the synthetic resin film 13 will be hard to separate from the electrode plate 11. The synthetic resin film 13 consists of an electrolytic-solution-resistant thermoplastic resin such as polyvinyl chloride, polystyrene, polypropylene and polyacrylic resin which is attached to the electrode plate proper 11 by injection or coating. For example, in forming the film 13 by injection of polypropylene, the polypropylene is heated to between 220°C and 250°C and injected under the pressure of 3.5 kg/cm$^2$ through an injection machine with a cylinder 18 mm$\phi$ in inside diameter and a nozzle 2 mm$\phi$ in diameter.

Next, the electrode plate was made to form a plurality of spaces, as shown in FIG. 3a, defined by hard-pressed portions of grid pattern along the periphery and inside of the electrode plate and to cover the hard-pressed portions with synthetic resin films 13. A study was carried out to know how the discharge capacity and the allowable number of charge-discharge cycles are affected by changing the number of the grid spaces. Each of the electrode plates employed in this test measured 350 mm × 175 mm × 2 mm, and the 5-hour rate discharge capacity and the cycle life of the battery with one positive electrode and two negative electrodes were examined. The life is measured from the number of the charge-discharge cycles counted till the discharge capacity of 20 Ah has been reached after repeating an 11-hour discharge through a 0.5 Ω resistor and 13-hour charge with a constant current of 4.5 A. The results of the test are shown in the table below.

Table 1

| Nos. of in-grid spaces | | | | | | |
|---|---|---|---|---|---|---|
| | No. of rows across | 8 | 10 | 12 | 14 | 16 |
| | No. of rows down | 4 | 5 | 6 | 7 | 8 |
| Discharge capacity | [Ah] | 44.8 | 44.0 | 43.1 | 42.6 | 40.0 |
| Life | [cycles] | 125 | 160 | 165 | 165 | 165 |

From this table, it has been found that, as far as the electrode of FIGS. 3a and 3b is concerned, the grid space of 25 mm to 35 mm is most recommendable to obtain the best discharge capacity and cycle life.

Figure 4:
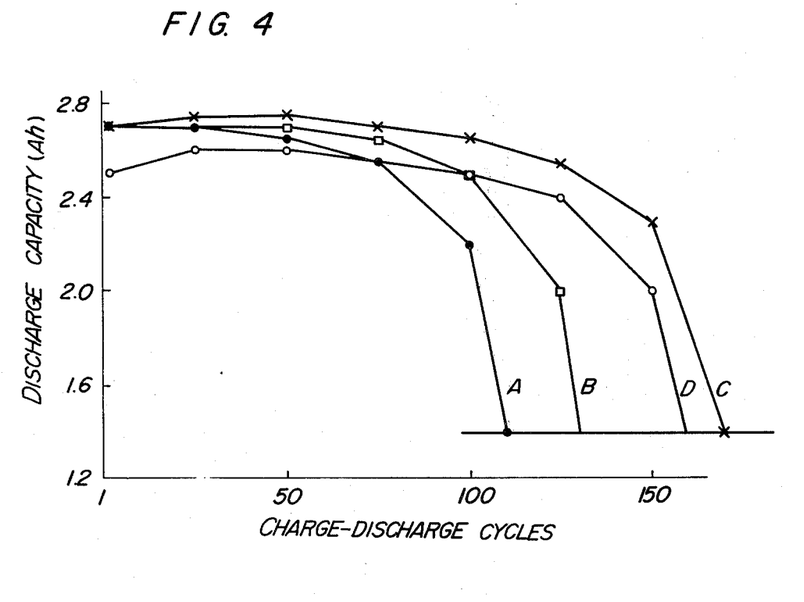
FIG. 4 is a characteristic diagram showing the effect that changes in lead fiber diameter have on the discharge capacity and the life of the battery in terms of the maximum available number of its charge-discharge cycles.

The diagram of FIG. 4 shows the results of a test conducted to find how the discharge capacity and the cycle life are affected by changing the diameter of lead fibers. The test included four types of fibers with different diameters, i.e., fabric A comprising 100% of fibers 70 to 100 μ in diameter, fabric B comprising 33% of fibers 150 to 200 μ and 67% of fibers 70 to 100 μ, fabric C comprising 67% of fibers 150 to 200 μ and 33% of fibers 70 to 100 μ and fabric D comprising 100% of fibers 150 to 200 μ. The battery employed comprises, as shown in FIGS. 2a and 2b, four positive electrodes and five negative electrodes of unwoven lead fabric each measuring 25 mm × 35 mm × 2 mm. All the other tests conducted in connection with the present invention involve the same electrodes, unless otherwise specified.

From the test results shown in FIG. 4, it is known that the lead fiber about 200 μ in diameter, or more specifically 150 to 200 μ in diameter provides the longest battery life. Further, an improved discharge capacity is obtained by adding a few lead fibers 70 to 100 μ to the lead fibers 150 to 200 μ.

Figure 5:
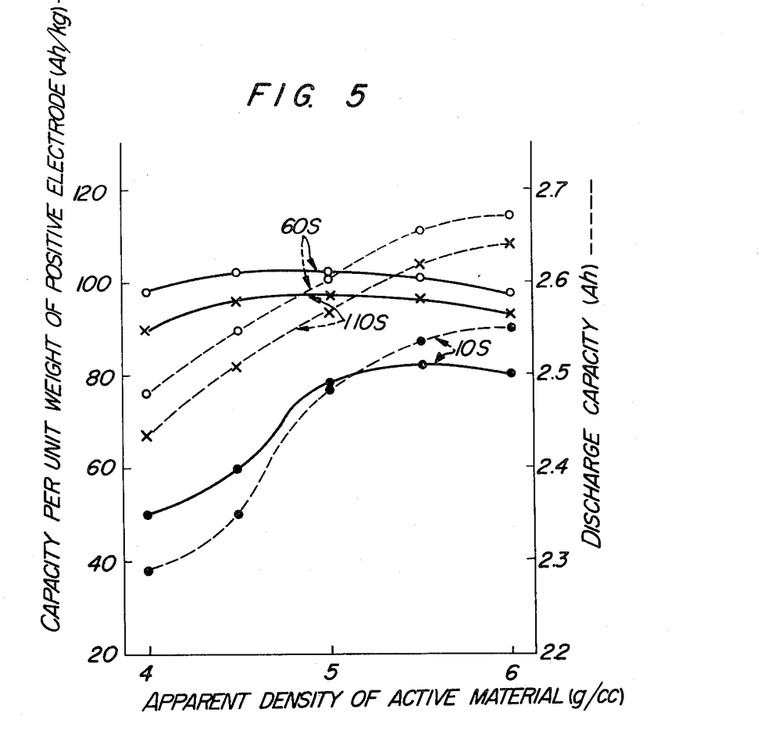
FIG. 5 is a characteristic diagram showing the effect of apparent density of the lead fibers on the discharge capacity of positive electrode.

The graph of FIG. 5 shows the results of a test conducted to find how the discharge capacity is affected by changes in the apparent density of the unwoven lead fabric which is the main component of the electrodes. In this figure, dotted lines show variations of the discharge capacity and symbol 10S shows the discharge capacity at 10th cycle, 60S the discharge capacity at 60th cycle, and 110S the discharge capacity at 110th cycle. It is seen from this graph that 5.0 to 5.5 g/cc of the apparent density of the unwoven lead fabric provides the highest utilization rate of the active material from beginning to end. In addition, the hard-pressed portions where the synthetic resin film is covered is desirable to be formed into more than 10 g/cc of the apparent density.

If the electrodes made of lead fabric are to be used as positive or negative electrodes, it is necessary to convert them into active materials. A common method of activating the lead fabric consists in anodizing both positive and negative electrodes. This process are followed by processes of electrolytic reduction and initial charging operation performed after incorporating the lead fabric in the battery container involved. Also, it is well known that barium sulfate or lignin may be added to the negative electrodes in order to improve the discharge characteristic.

Figure 6:
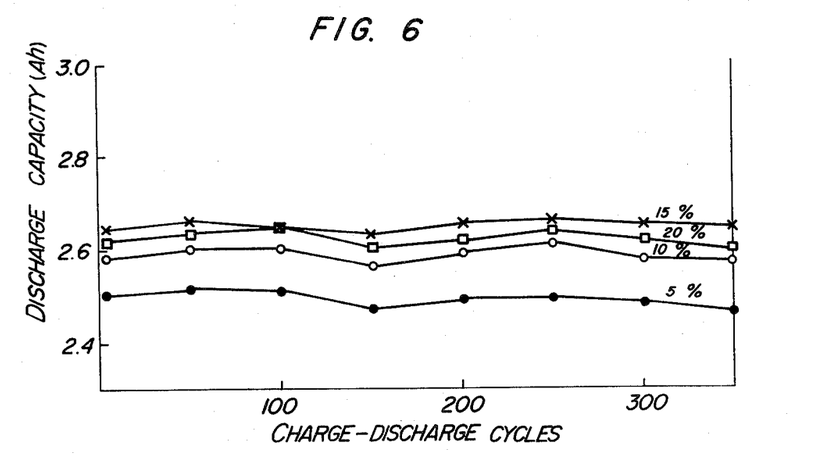
FIG. 6 is a characteristic diagram showing how the discharge capacity and the cycle life of the negative electrode are affected by the concentration of aqueous solution of $BaCl_2$ in adding $BaSO_4$ as an expander.

In this connection, the inventors have studied the manner in which barium sulfate is added to the negative electrodes. Of course, $BaSO_4$ is able to be added to the negative electrodes in a form of powder as in the paste type of electrodes, so the inventors have tried a test of adding $BaSO_4$ by a manner of immersing the fibrous lead plates into a $BaCl_2$ aqueous solution. FIG. 6 shows a result of this test how the discharge capacity and the cycle life are affected by changes in the concentration of $BaCl_2$ aqueous solution. In FIG. 6, the curves marked with 5%, 10%, 15% and 20% respectively concern $BaCl_2$ aqueous solutions of so many percentages in concentration. It will be understood from FIG. 6 that the optimum concentration of $BaCl_2$ aqueous solution is 15% and that generally it should be between 10% and 20%.

Figure 7:
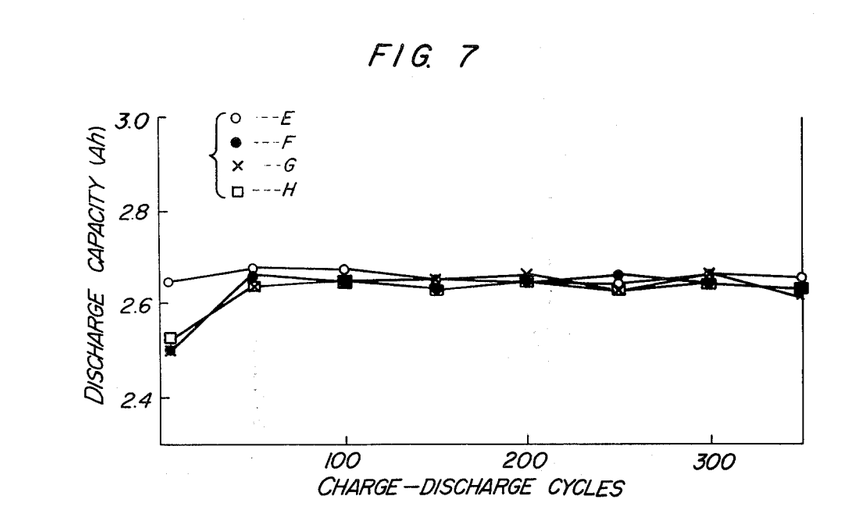
FIG. 7 is a characteristic diagram showing how the discharge capacity and the cycle life are affected by an opportunity when $BaSO_4$ is added.

The graph of FIG. 7 shows the discharge capacity relative to charge-discharge cycles obtained by setting different timings at which barium sulfate is added to the electrode plate by immersing into 15% barium chloride aqueous solution. Such timings included "before anodizing," "immediately after anodizing," "when current equivalent to 50% of discharge capacity of the electrode plate flowed in the midst of electrolytic reduction" and "immediately after electrolytic reduction." Those electrode plates which were immersed in $BaCl_2$ aqueous solution in the midst of or after electrolytic reduction were subjected to a second electrolytic reduction thereby to remove chlorine ions. The symbols E, F, G and H in FIG. 7 show the characteristics obtained by immersion in $BaCl_2$ aqueous solution before anodizing, immediately after anodizing, in the midst of electrolytic reduction and after electrolytic reduction respectively. The test results of FIG. 7 show that the best timing of adding barium sulfate to the negative electrodes to obtain the highest rate of utilization of the active material from the beginning of charge-discharge operations is immediately before anodizing. All the above facts tell that it is most desirable that the anodizing operation be performed immediately after immersing the electrode plates in 15% barium chloride aqueous solution for 10 hours and then drying it at 80°C for 2 hours.

Figure 8:
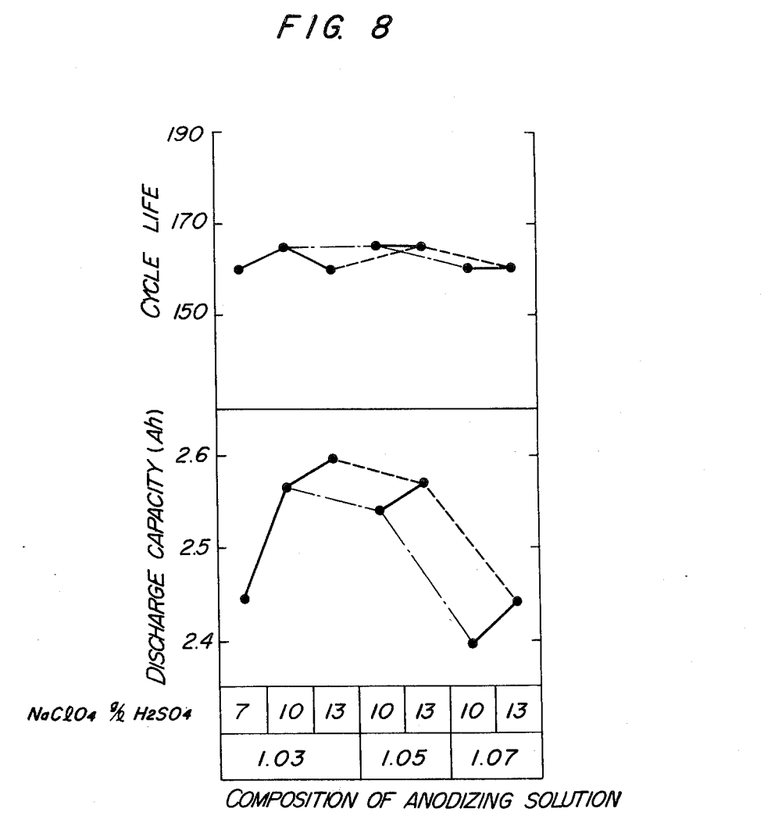
FIG. 8 is a characteristic diagram showing how the discharge capacity and the cycle life are affected by the composition of the electrolytic solution used for the anodic corrosion of the electrode plate.

The inventors have also studied the various methods of anodizing the electrode plates of lead fabric. The method of anodizing the electrode plates according to the present invention follows the conventional process in which the Tudor type of electrode plate is anodized in a mixture solution of $NaClO_4$ and $H_2SO_4$ with pure lead as an opposite electrode. A study was made of how the discharge capacity and the cycle life are affected by changing the specific gravity of $H_2SO_4$ solution and the amount of $NaClO_4$ to be added to the $H_2SO_4$ solution. The diagram of FIG. 8 shows the results of such a test in which the anodizing was conducted at a bath temperature of 30° ± 2°C and current density of 14 $mA/cm^2$ for 20 hours. From this graph, it is apparent that the largest discharge capacity and longest life in terms of the number of charge-discharge cycles are obtained when 10 to 13 g of anodizing agent $NaClO_4$ is added to every 1 litre of $H_2SO_4$ solution and the specific gravity of $H_2SO_4$ solution is made 1.03 to 1.05.

Figure 9:
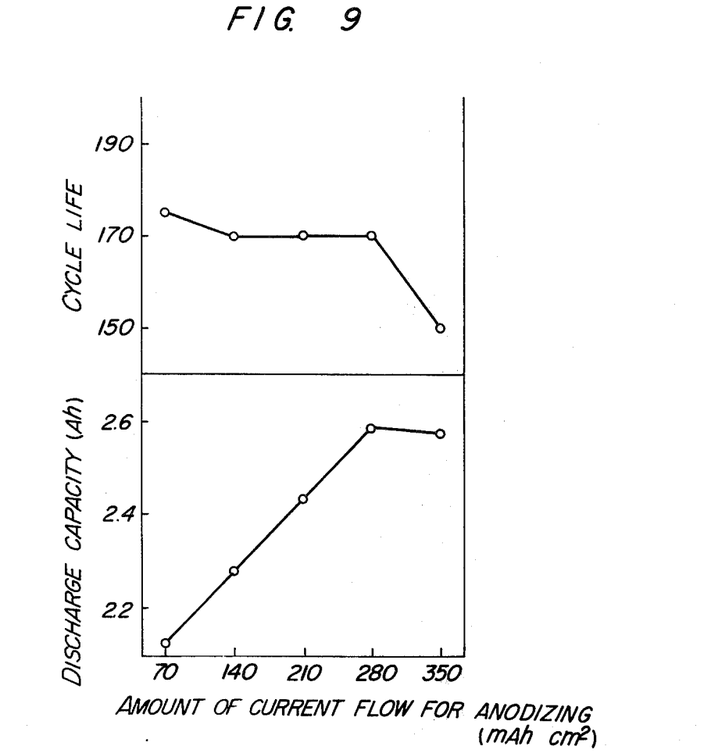
FIG. 9 is a characteristic diagram showing how the discharge capacity and the cycle life are affected by changes in the amount of current flowing to a unit area of the electrode plate for anodic corrosion.

FIG. 9 shows the results of a test conducted to find how the discharge capacity and the cycle life are affected by changing the amount of electric current flowing through the unit area of the electrode plate in anodizing. In this test, the electrolytic solution used consists of $H_2SO_4$ solution 1.03 in specific gravity with $NaClO_4$ 13 g per litre thereof, while the bath temperature was maintained at 30° ± 2°C and current density at 14 $mA/cm^2$. It is known from the test results that it is desirable to set the rate of current conduction at 280 $mAh/cm^2$ at the anodizing operation. This means that 20 hours of anodizing operation is desirable at the current density of, say, 14 $mA/cm^2$.

The above tests were followed by another test of electrolytic reduction which was conducted immediately after the anodizig operation. As a result, we have reached the conclusion that the electrolytic reduction had best be made in a sulfuric acid aqueous solution of 1.15 specific gravity after washing the anodized electrodes in water. Also, it has been found that the amount of current to be applied for electrolytic reduction should be the same as that applied for anodizing. As an example, current 14 $mA/cm^2$ in density should be applied for 20 hours.

The electrode plates electrolytically reduced after anodizing was incorporated in the battery container, and after injecting electrolytic solution into the battery, the initial charging operation was conducted thereby to develop the electrode plates into positive and negative electrodes.

Figure 10:
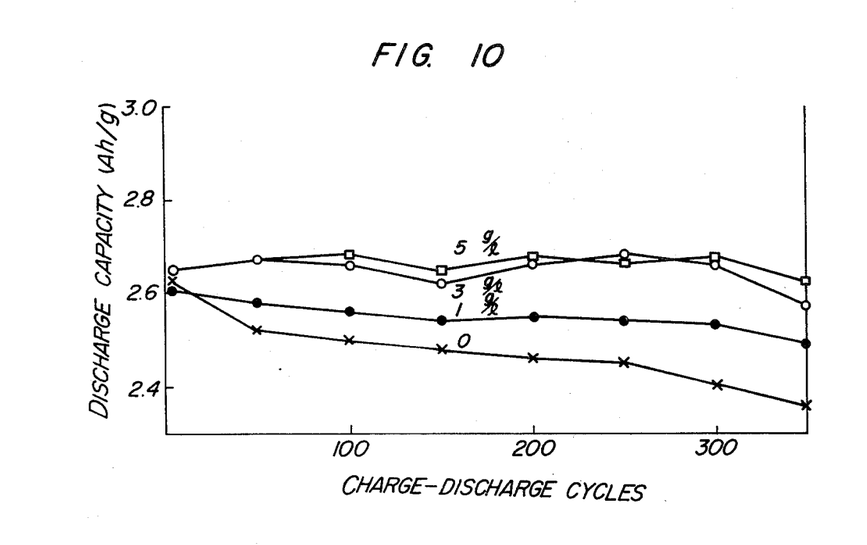
FIG. 10 is a characteristic diagram showing how the discharge capacity and the cycle life of negative electrode are affected by changes in the concentration of ligninsulfonate dissolved in the electrolytic solution.

It was already mentioned that the discharge characteristic is improved also by adding lignin to the negative electrode. In this connection, the inventors have studied various amounts of lignin sulfonate to be added and have obtained the results shown in FIG. 10. In this test, lignin sulfonate was added to the electrolytic solution of sulfuric acid aqueous solution of 1.28 specific gravity at the time of initial charging. In this figure, the curves marked with 0, 1 g/l, 3 g/l and 5 g/l show the cases in which lignin sulfonate was added in the amount of 0, 1 g/l, 3 g/l and 5 g/l respectively. This figure shows that the optimum amount of lignin sulfonate to be added is 3 to 5 g/l.

Figure 11:
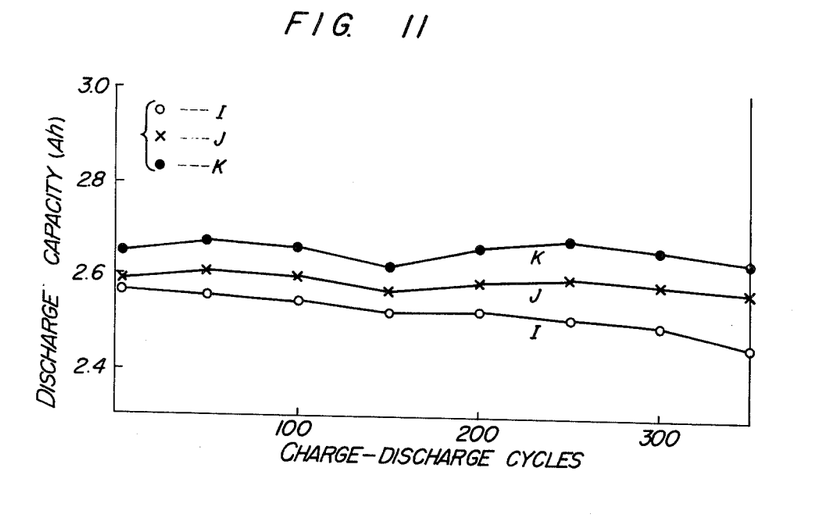
FIG. 11 is a characteristic diagram showing the differences of discharge capacity and the cycle life caused from the differences in which electrolyte the ligninsulfonate are added. (anodic corrosion, or cathodic reduction, or initial charge.)

The graph of FIG. 11 shows the results of a test conducted by the inventors to find how the discharge capacity and the cycle life are affected by changing the timing at which lignin sulfonate of 5 g/l is added to the electrolytic solution. In this figure, the curves marked with symbols I, J and K show the results obtained when lignin sulfonate was added "at the same time as barium chloride," "at the time of electrolytic reduction" and "at the time of initial charging" respectively. It will be understood that in order to achieve a superior discharge capacity, it is desirable that lignin sulfonate be added at the time of initial charging.

Figures 12A, 12B:
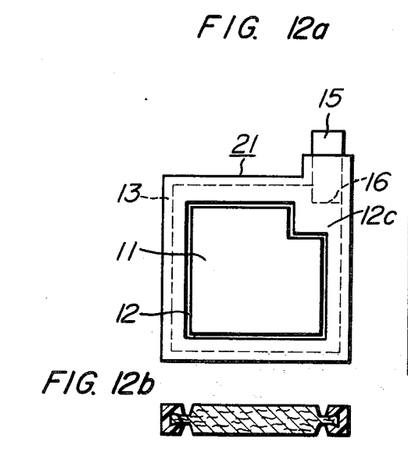
FIGS. 12a and 12b show front and sectional views respectively of the positive electrode.
Figures 13, 14A, 14B:
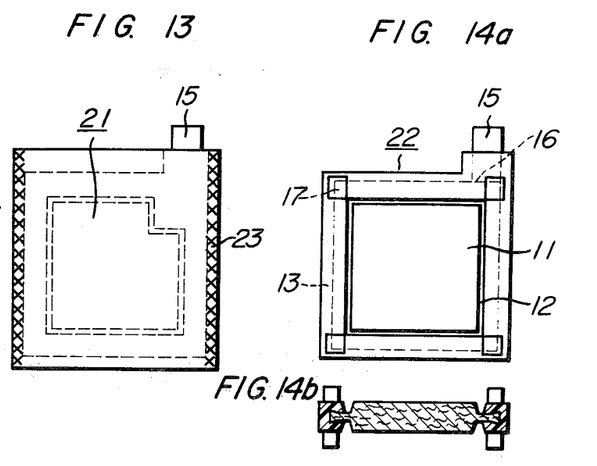
FIG. 13 shows the front view of the positive electrode as it is covered with an ion-permeable cover.
FIGS. 14a and 14b show front and sectional views respectively of the negative electrode.

Charge-discharge cycles were repeated of the lead storage battery assembled in the manner described above and it was found that the life of the battery depends upon its positive electrode plates. Two main reasons for which the life of the positive plates vanishes include removal of active material and corrosion of the weld zone between the electrode plate and lead-out piece. To prevent early corrosion and strengthen the weld zone, the portion of the positive plate proper 11 at which the lead-out piece 15 is welded is provided with a notch in which, as shown in FIG. 12, the lead-out piece 15 is fitted to enlarge the weld zone 16, and further the peripheral hard-pressed portion 12c of the weld zone 16 is enlarged, as well as expanding the synthetic resin film 13 so as to cover a considerably larger area than the weld zone 16. Also, as shown in FIG. 13, the positive plate 21 was protected by an ion-permeating porous bag-shaped cover 23 of thermoplastic synthetic resin, which was closely attached to the surface of positive electrode 21 by thermoplasticization thereby to prevent the active material from coming off from the positive plate. In addition, protrusions 17 integral with the synthetic resin film 13 were formed at the four corners of the negative plate 22 so that the positive plate 21 and the negative plate 22 were maintained in predetermined spaced relationship with each other with the protrusions 17 as a separator, as shown in FIG. 14.

The cover 23 was obtained by either of the following methods: In one method, starch or zinc oxide powder 50 to 70% by volume which is soluble in water or acid was added to polyethylene, heated up to about 200°C, kneaded, pressure-rolled into a sheet about 0.2 mm thick by means of a hot roller, which sheet was immersed in aqueous solution of sulfuric acid to dissolve away the soluble powder and thereby to achieve porosity. Another method consisted in adding zinc oxide 50 by volume to the inter-polymer of vinyl chloride and vinyl acetate, mixing them adequately in a ball mill into a paste, coating the mixture on a 0.17 mm-thick unwoven fabric of polyvinyl chloride to the thickness of about 0.2 mm by means of calendar roll, drying and immersing the resultant assembly in an aqueous solution of sulfuric acid, thereby to dissolve away the soluble zinc oxide and obtain a porous sheet. This sheet was folded into two and both sides thereof fusion-bonded to obtain the bag-shaped cover 23.

Figure 15:
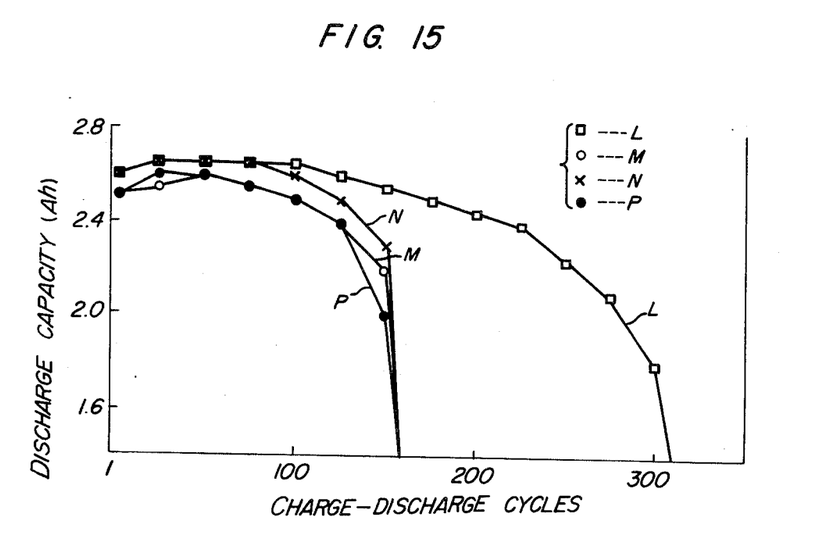
FIG. 15 is a characteristic diagram showing how the discharge capacity and the cycle life are affected by changes in the configuration of the electrode plates.

The diagram of FIG. 15 shows the results of a comparison made between the life in terms of the number of charge-discharge cycles of the lead storage battery with the above-mentioned electrode plate arrangement and that of the lead storage battery with a different electrode arrangement. In this figure, the reference symbol L shows the performance of a lead storage battery with the weld zone 16 of positive plate 21 improved as shown in FIG. 12 and with the postive plates 21 protected by the cover 23, symbol M that of a lead storage battery of which only the weld zone 16 has been improved as shown in FIG. 12, symbol N that of a lead storage battery of which the only improvement consists in the protection of positive plate 21 with the cover 23, and symbol P that of a lead storage battery on which none of the above improvements have been made. This graph shows that no single improvement results in a longer battery life, although the combination of the above two improvements extends it greatly.

Taking into consideration all of the above-mentioned facts and test results, the optimum embodiment of the present invention may be produced as follows: First, lead fabric is produced by a manufacturing plant as shown in FIG. 1 from a lead alloy consisting of lead and 0.1% to 0.3% Ag, As and/or Sn by weight. Most of the fibers making up the lead fabric measure 150 to 200 $\mu\phi$ in diameter, while about 30% by weight of them have the diameter of 70 to 100 $\mu\phi$. From this lead fabric is produced unwoven fabric, which is cut into a predetermined size of the electrode plate proper 11 and pressed into 5.0 to 5.5 g/cc in density. For a small electrode proper 11, its peripheral portion is pressed as shown in FIG. 2, to form a hard-pressed portion 12 having the density of 10 g/cc or more. For a large electrode plate, by contrast, the peripheral and inside portions in the form of a grid of the electrode plate proper 11 are pressed, as shown in FIG. 13, thereby to form hard-pressed portions 12, the grid space of the hard pressed portions 12 being maintained at 25 to 35 mm. The hard-pressed portion 12 formed on the periphery of electrode plate proper 11 is pressed to form a wedge-shaped section in such a manner that the inside of the periphery is thinner than the outside thereof. Furthermore, a larger area is pressed more strongly in the corner welded with the lead piece 15 than in the other corners of the positive electrode plate 21, as shown in FIG. 12, the lead piece 15 of a lead-alloy being welded at one corner of the electrode plate proper 11. A notch where the lead piece 15 is fitted in for weldment is provided in a corner of the electrode plate 21, thereby obtaining a large weld zone 15 for increases strength. The hard-pressed portion 12 of the electrode plate 11 is covered with a thermoplastic synthetic resin film 13 by injection molding. The positive plate 21 is covered with the film, as shown in FIG. 12a, to the extent considerably greater than the weld zone 16 of lead-out piece 15. The negative electrode plate 22, as shown in FIG. 14a, has its four corners provided with protrusions 17 integral with the film 12. The negative electrode plate 22 is immersed in an aqueous solution of barium chloride 15% or more in concentration for 10 hours or longer, thereby to add barium sulfate to the electrode plate 22. After this process, the electrode plate 22 is dried at 80°C for 2 hours. The electrode plates 21 and 22 are immersed in $H_2SO_4$ solution 1.03 to 1.05 in specific gravity to which $NaClO_4$ is added at the rate of 10 to 13 g/l. Under this condition, an anodizing operation is performed at a bath temperature of 30° ± 2°C and current density of 14 mA/cm$^2$ for 20 hours with an electrode plate of pure lead as an opposite electrode. The electrode plates 21 and 22 are washed with water, immersed in $H_2SO_4$ solution 1.15 in specific gravity and electrolytically reduced at a current density of 14 mA/cm$^2$ for 20 hours as in the preceding anodizing operation, thereby removing Cl$^-$ and ClO$^-$ ions from the electrode plates. As shown in FIG. 13, the electrode plate 21 is protected with a bag-shaped porous cover 23 of thermocontractive synthetic resin, whereupon the cover 23 is contracted by heat to be closely attached to the surface of electrode plate 21. The positive electrode plate 21 and negative electrode plate 22 are arranged alternately in several layers to form a group of electrode plates which are incorporated in the lead storage battery. Electrolytic solution comprising $H_2SO_4$ solution 1.28 in specific gravity with lignin sulfonate added thereto at the rate of 3 to 5 g/l is injected into the lead storage battery. This battery is charged for the first time to make the electrode plates 21 and 22 electrically positive and negative respectively.

Figure 16:
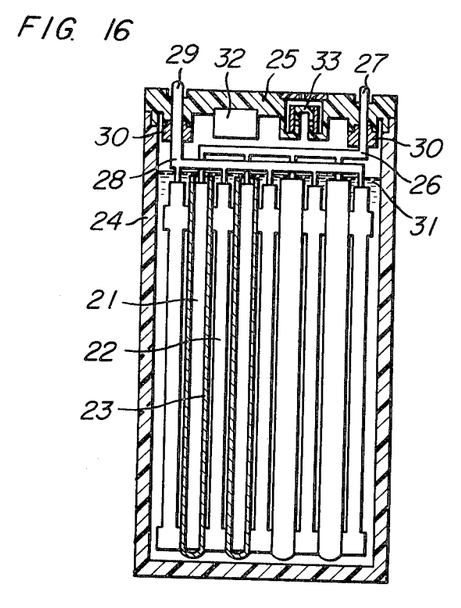
FIG. 16 is a diagram of a side sectional view showing the whole structure of the lead storage battery embodying the present invention.
Figure 17:
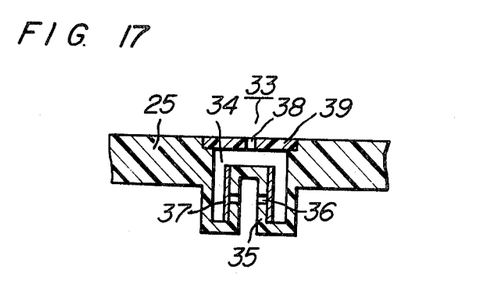
FIG. 17 is an enlarged sectional view showing the gas exhaust valve of the embodiment of FIG. 16.

The whole structure of the lead storage battery thus completed is shown in FIG. 16. In this figure, the reference numeral 21 shows a positive electrode, numeral 22 a negative electrode, numeral 23 an ion-permeating cover protecting the positive electrode 21, numeral 24 an electrolytic cell made of ABS resin, numeral 25 a lid thereof, numeral 26 a lead for the positive electrode, numeral 27 a positive terminal, numeral 28 a lead for the negative electrode, numeral 29 a negative terminal, numeral 30 a rubber packing, numeral 31 an electrolytic solution, numeral 32 a catalyst for removing gases, and numeral 33 a gas exhaust valve. The gas-removing catalyst 32, which consists of ethylene tetrafluoride powder press-molded together with artificial graphite powder deposited with a metal catalyst such as palladium, causes oxygen and hydrogen to react with each other to prevent the gas pressure in the battery from increasing at the time of charging. The gas exhaust valve 33, as shown in FIG. 17, is provided with a cylinder 35 with a closed ceiling on the bottom of a recess 34 formed in the lid 25. The cylinder 35 has an exhaust port 36 on its side walls, while a rubber tube 37 is covered on the outside wall of the cylinder and the recess 34 is closed with the lid 39 through which the exhaust port 38 is bored. When the gas pressure in the battery rises to a predetermined level, the rubber tube 37 expands so that the gases in the battery are exhausted through the exhaust port 36, between tube 37 and cylinder 35, and through the exhaust port 38, thereby preventing the gas pressure in the battery from rising above the predetermined level.

Table 2 below shows the results of a comparison of characteristics made between the lead storage battery (A) according to the present invention and a conventional pastetype of lead storage battery (B).

Table 2

| Characteristics Items | Weight [g] | 5-hour rate discharge | | | |
|---|---|---|---|---|---|
| | | Capacity [Ah] | Flat voltage [V] | Output energy [Wh] | Output energy per unit weight [Wh/kg] |
| Battery A | 145 | 2.60 | 2.05 | 5.33 | 36.8 |
| Battery B | 160 | 2.40 | 2.03 | 4.87 | 30.4 |

| 10-minute rate discharge | | | | |
|---|---|---|---|---|
| Capacity [Ah] | Flat voltage [V] | Output energy [Wh] | Output energy per unit weight [Wh/kg] | Life [Nos. of cycles] |
| 1.67 | 1.98 | 3.31 | 22.8 | 310 |
| 1.06 | 1.95 | 2.07 | 12.9 | 180 |

It will be understood from the above explanation that the lead storage battery according to the present invention has a higher energy density and longer life in terms of the number of charge-discharge cycles than the conventional lead storage batteries.

What we claim is:

1. A method of manufacturing a lead storage battery, comprising the steps of:
    forming electrode plates of non-woven lead fibers to a desired size and shape;
    hard pressing the periphery of said plates to a greater density than the remainder of said plates;
    welding lead out pieces to a portion of said hard-pressed peripheral portion of said plates;
    covering said hard-pressed peripheral portions and lead out pieces with a synthetic resin film;
    anodizing said electrode plates;
    electrolytically reducing said anodized plates;
    incorporating said reduced plates and an electrolytic solution into a container; and
    charging said plates so that some of said plates are negatively charged and others are positively charged.

2. A method of manufacturing a lead storage battery according to claim 1, wherein said hard-pressed peripheral portions of said electrode plates are hard pressed to a density of not less than 10 g/cc and the remainder of each plate is hard pressed to a density of between 5.0 and 5.5 g/cc.

3. A method of manufacturing a lead storage battery according to claim 1, wherein said electrode plates are formed by mixing a first amount of lead fibers having a diameter of about 150 $\mu\phi$ to 200 $\mu\phi$ and a second, smaller amount of lead fibers having a diameter of about 70 $\mu\phi$ to 100 $\mu\phi$ and thereafter pressing said mixture into a desired size and shape.

4. A method of manufacturing a lead storage battery according to claim 1, wherein said hard-pressing step further includes hard pressing further portions of said electrode plates to form grid patterns, the space within each grid having a width between 25 mm and 35 mm, and boring at least one connecting aperture through the hard-pressed portions of said electrode.

5. A method of manufacturing a lead storage battery according to claim 1, further comprising the steps of:
    forming a plurality of protrusions on the synthetic resin film covering those plates to be negatively charged;
    closely attaching an ion-permeating cover to those of said anodized electrode plates to be positively charged; and
    alternately arranging plates having protrusions thereon and plates having closely attached ion-permeating covers in said container after said reducing step and before said charging step.

6. A method of manufacturing a lead storage battery according to claim 1, further comprising the step of immersing some of said plates in an aqueous solution of barium chloride before said anodizing step to add barium sulfate to said plates, such that those plates treated with said barium chloride solution are negatively charged and the remainder of said plates are positively charged during said charging step.

7. A method of manufacturing a lead storage battery according to claim 6, wherein said electrode plates to negatively charged are immersed in an aqueous solution of barium chloride 10 to 20% in concentration for not less than 10 hours in order to add barium sulfate to said electrode plates which are to become negative electrode plates.

8. A method of manufacturing a lead storage battery according to claim 6, wherein said anodizing step includes immersing said electrode plates in an electrolytic solution comprising a mixture of an aqueous solution of $H_2SO_4$ 1.03 to 1.05 in specific gravity and $NaClO_4$ 10 to 13 g per each litre of said aqueous solution of $H_2SO_4$.

9. A method of manufacturing a lead storage battery according to claim 6, wherein an electric current of 280 mAh/cm$^2$ is passed per unit area of said electrode plates in anodizing said electrode plates, and an electric current of 280 mAh/cm$^2$ is passed per unit area of said electrode plates for electrolytic reduction thereof.

10. A method of manufacturing a lead storage battery according to claim 6, wherein the electrolytic solution used for the initial charging of said battery comprises a mixture of an aqueous solution of $H_2SO_4$ 1.28 in specific gravity and lignin sulfonate 3 to 5 g per litre of said aqueous solution of $H_2SO_4$.

11. A method of manufacturing a lead storage battery comprising steps of cutting to a predetermined size unwoven fabric comprising mainly of lead fibers 150 to 200 $\mu\phi$ in diameter, pressing said unwoven fabric into a density of 5.0 to 5.5 g/cc, pressing the resulting electrode plate proper at least at the peripheral portion thereof into a density of not less than 10 g/cc more strongly than at any other portions of said electrode plate proper, welding a lead-out piece to a peripheral portion of said electrode plate proper, covering a synthetic resin film by injection molding over a weld zone between said peripheral portion and lead-out piece, immersing in an aqueous solution of $BaCl_2$ those of said electrode plates which are to become negative electrode plates, thereby to add barium sulfate to said electrode plates which are to become negative electrode plates, anodizing in an aqueous solution comprising a mixture of $NaClO_4$ and $H_2SO_4$ both of the electrode plates which are to become negative and positive electrode plates, washing in water and electrolytically reducing said two types of electrode plates in an aqueous solution of $H_2SO_4$, incorporating said two types of electrode plates in a container, and injecting into said container an electrolytic solution comprising a mixture of an aqueous solution of $H_2SO_4$ and lignin sulfonate thereby to perform an initial charging of said lead storage battery.

\* \* \* \* \*